United States Patent
Ghoneim et al.

(10) Patent No.: US 10,272,919 B2
(45) Date of Patent: Apr. 30, 2019

(54) METHODS AND SYSTEMS FOR ESTIMATING ROAD SURFACE FRICTION COEFFICIENT USING SELF ALIGNING TORQUE

(71) Applicant: GM GLOBAL TECHNOLOGY OPERATIONS LLC, Detroit, MI (US)

(72) Inventors: Youssef A. Ghoneim, Rochester, MI (US); Qingrong Zhao, Madison Heights, MI (US); Qi Zhang, Sterling Heights, MI (US); Bakhtiar B. Litkouhi, Washington, MI (US); Yingmei Si, West Bloomfield, MI (US); David M. Sidlosky, Beverly Hills, MI (US); Valarie V. Boatman, Novi, MI (US); Sami Ahmed, Orion Township, MI (US)

(73) Assignee: GM GLOBAL TECHNOLOGY OPERATIONS, LLC MI (US)

( * ) Notice: Subject to any disclaimer, the term of this patent is extended or adjusted under 35 U.S.C. 154(b) by 332 days.

(21) Appl. No.: 14/510,862

(22) Filed: Oct. 9, 2014

(65) Prior Publication Data
US 2016/0101782 A1 Apr. 14, 2016

(51) Int. Cl.
*B60W 40/06* (2012.01)
*B60W 40/068* (2012.01)

(52) U.S. Cl.
CPC ....... *B60W 40/068* (2013.01); *B60W 2520/10* (2013.01); *B60W 2520/125* (2013.01); *B60W 2520/14* (2013.01); *B60W 2520/20* (2013.01); *B60W 2540/18* (2013.01)

(58) Field of Classification Search
None
See application file for complete search history.

(56) References Cited

U.S. PATENT DOCUMENTS

| 2004/0133330 A1* | 7/2004 | Ono | B60T 8/172 701/80 |
|---|---|---|---|
| 2010/0209886 A1* | 8/2010 | Lin | G09B 19/167 434/65 |
| 2011/0130974 A1* | 6/2011 | Yngve | B60W 40/068 702/41 |

* cited by examiner

*Primary Examiner* — Hussein Elchanti
*Assistant Examiner* — Paul A Castro
(74) *Attorney, Agent, or Firm* — Lorenz & Kopf, LLP

(57) ABSTRACT

Methods and systems for determining road surface information in a vehicle. In one embodiment, the method includes: determining at least one condition assessment value based on steering data; determining a feature set to include at least one of self-aligning torque (SAT), slip angle, SAT variance, steering rate, and lateral acceleration based on the condition assessment value; processing steering data obtained during a steering maneuver and associated with the feature set using a pattern classification technique; and determining a surface type based on the processing.

15 Claims, 4 Drawing Sheets

METHODS AND SYSTEMS FOR ESTIMATING ROAD SURFACE FRICTION COEFFICIENT USING SELF ALIGNING TORQUE

TECHNICAL FIELD

The technical field generally relates to vehicles, and more particularly to methods and systems for estimating road surface information for use in controlling a vehicle.

BACKGROUND

It is desirable to know the road surface friction coefficient during vehicle operation. For example, a control system may use this information to control one or more vehicle components to aid the driver in operating a vehicle in a safe manner. Currently there is no method to directly measure the road surface friction coefficient. The road surface friction coefficient therefore must be estimated using sensor information that is available on the vehicle. Conventional techniques of estimating the road surface friction coefficient may be unreliable as they are sensitive to different vehicle dynamic behaviors such as steering behaviors, among others.

Accordingly, it is desirable to provide improved methods and systems for determining a type of a road surface. Furthermore, other desirable features and characteristics of the present invention will become apparent from the subsequent detailed description and the appended claims, taken in conjunction with the accompanying drawings and the foregoing technical field and background.

SUMMARY

Methods and systems for determining road surface information in a vehicle is provided. In one embodiment, the method includes: determining at least one condition assessment value based on steering data; determining a feature set to include at least one of self-aligning torque (SAT), slip angle, SAT variance, steering rate, and lateral acceleration based on the condition assessment value; processing steering data obtained during a steering maneuver and associated with the feature set using a pattern classification technique; and determining a surface type based on the processing.

In one embodiment, a system includes: a condition assessment module that determines at least one condition assessment value based on steering data. A feature set determination module determines a feature set to include at least one of self-aligning torque (SAT), slip angle, SAT variance, steering rate, and lateral acceleration based on the condition assessment value. A surface classification module processes the steering data obtained during a steering maneuver and associated with the feature set using a pattern classification technique to determine a surface type.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
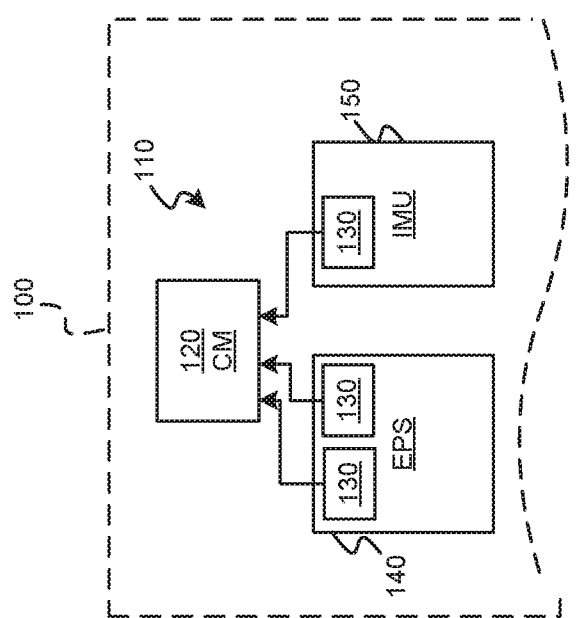
FIG. 1 is a functional block diagram of an exemplary vehicle, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

With reference to FIG. 1, an exemplary vehicle 100 in part that includes a control system 110 is shown in accordance with exemplary embodiments. As can be appreciated, the vehicle 100 may be any vehicle type that travels over a road surface. Although the figures shown herein depict an example with certain arrangements of elements, additional intervening elements, devices, features, or components may be present in actual embodiments. It should also be understood that FIG. 1 is merely illustrative and may not be drawn to scale.

The control system 110 includes a control module 120 that receives inputs from one or more sensors 130 of the vehicle 100. The sensors 130 sense observable conditions of the vehicle 100 and generate sensor signals based thereon. For example, the sensors 130 may sense conditions of an electric power steering system 140 of the vehicle 100, an inertial measurement unit 150 of the vehicle 100, and/or other systems of the vehicle 100 and generate sensor signals based thereon. In various embodiments, the sensors 130 communicate the signals directly to the control module 120 and/or may communicate the signals 130 to other control modules (not shown) which, in turn, communicate data from the signals to the control module 120 over a communication bus (not shown) or other communication means.

The control module 120 receives the signals and/or the data captured by the sensors and estimates a surface type and a surface value (correlating with the road surface friction coefficient) based thereon. In various embodiments, as will be discussed in greater detail below, the control module 120 determines the surface type based on a multi-classifier pattern classification technique that evaluates data obtained during a steering maneuver. The surface can be, for example, ice, packed snow, dry, or other type. The control module 120 determines the surface value based on the determined surface type. The surface value can be a nominal value, for example, between 0 and 1 that is associated with the particular surface type. Typical values are 0.1 for ice, 0.35 for snow, and 1.0 for dry. The control module 120 generates signals to control one or more components of the vehicle 100 based on the surface value and/or the surface type, and/or provides the surface value and/or the surface type to other control systems (not shown) of the vehicle 100 for further processing and control of components of the vehicle 100.

Figure 2:
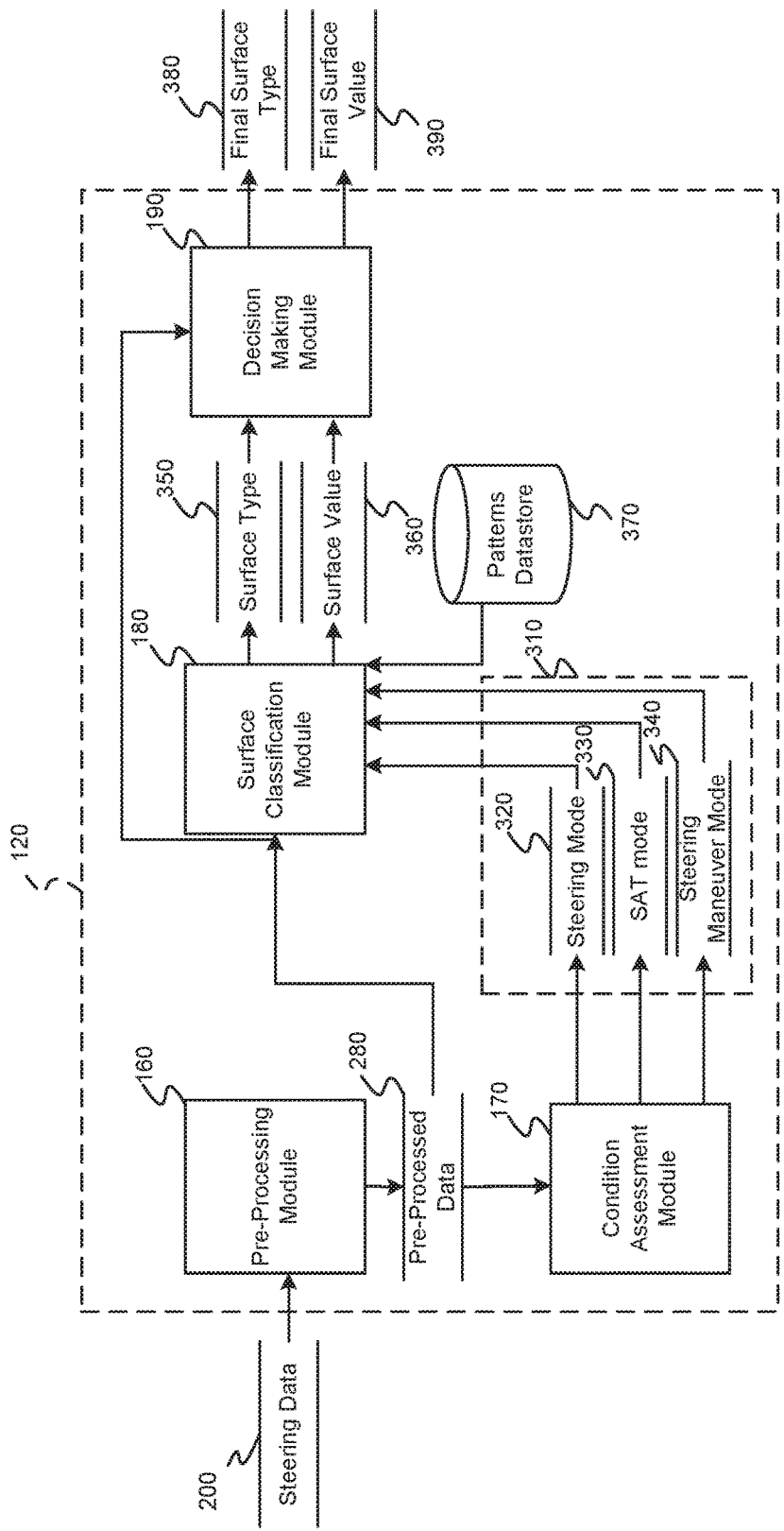
FIG. 2 is a dataflow diagram illustrating a control module of the vehicle, in accordance with various embodiments.

Referring now to FIG. 2 and with continued reference to FIG. 1, a dataflow diagram illustrates the control module 120 in accordance with various exemplary embodiments. As can be appreciated, various exemplary embodiments of the control module 120, according to the present disclosure, may include any number of sub-modules. In various exemplary embodiments, the sub-modules shown in FIG. 2 may be combined and/or further partitioned to similarly estimate road surface information and to control one or more components of the vehicle 100 (FIG. 1) based thereon. In various exemplary embodiments, the control module 120 includes a pre-processing module 160, a condition assessment module 170, a surface classification module 180, and a decision making module 190.

The pre-processing module 160 receives as input steering data 200 that is sensed by the sensors 130 (FIG. 1) and/or determined by the control module 120 or other control modules (not shown) over a particular time period. The steering data 200 includes, but is not limited to, steering angle data, yaw rate data, longitudinal velocity data, pinion angle data, motor torque data, torsion bar torque data, and lateral acceleration data, among other data. The pre-processing module pre-processes the steering data 200 to remove noise and other inaccuracies. The pre-processing module 160 then uses the pre-processed data 280 to determine self-aligning torque (SAT) data, slip angle data, lateral acceleration data, and steering rate data. For example, the SAT data represents torque that a tire creates as it is steered along a surface which tends to align the tire with the vehicle direction of travel. The pre-processing module 160 determines the SAT data and other data using methods commonly known in the art.

The condition assessment module 170 receives as input the pre-processed data 280 including the steering rate data, the steering angle data, the SAT data, the slip angle data, and the lateral acceleration data. Based on the inputs, the condition assessment module 170 determines condition assessment values 310. In various embodiments, the condition assessment values 310 include a steering mode 320, a SAT mode 330, and a steering maneuver mode 340.

In various embodiments, the condition assessment module 170 evaluates the steering rate data to determine the steering mode 320. The condition assessment module 170 sets the steering mode 320 to indicate a steering speed, such as, fast steering or normal steering. For example, if the value of the steering rate data is large (e.g., greater than a threshold), then the condition assessment module 170 sets the steering mode 320 to indicate fast steering. In another example, if the value of the steering rate data is small (e.g., smaller than a threshold), then the condition assessment module 170 sets the steering mode 320 to indicate normal steering. As can be appreciated, in various embodiments, the condition assessment module 170 can set the steering mode 320 to indicate other steering speeds and is not limited to the present examples.

In various embodiments, the condition assessment module 170 evaluates the SAT data, and the lateral acceleration data to determine the SAT mode 330. The condition assessment module 170 sets the SAT mode 330 to indicate a linearity of the SAT data such as, linear and non-linear. For example, if the magnitudes of the SAT data are increasing and the magnitudes of the lateral acceleration data are increasing, the condition assessment module 170 sets the SAT mode 330 to indicate linear. In another example, if the magnitudes of the SAT data are decreasing and the magnitudes of the lateral acceleration data increasing, the condition assessment module 270 sets the SAT mode 330 to indicate non-linear. As can be appreciated, in various embodiments, the condition assessment module 170 can set the SAT mode 330 to indicate other forms of linearity and is not limited to the present examples.

In various embodiments, the condition assessment module 170 evaluates the steering angle data to determine the steering maneuver mode 340. The condition assessment module 170 sets the steering maneuver mode 340 to indicate a steering maneuver type such as, a steering out maneuver, or a non-steering out maneuver. For example, the condition assessment module 170 tracks the steering angle data based on two (or more) temporal moving windows of different sizes. If increments exist in both windows and the increments exceed a threshold, then the condition assessment module 170 determines that the data is associated with a steering out maneuver and sets the steering maneuver mode 340 to indicate steering out maneuver. If, however an increment does not exist in both windows or an increment does not exceed a threshold, then the condition assessment module 170 determines that the data is not associated with a steering out maneuver and sets the steering maneuver mode 340 to indicate a non-steering out maneuver. As can be appreciated, in various embodiments, the condition assessment module 170 can set the steering maneuver mode 340 to indicate other steering maneuvers and is not limited to the present examples.

The surface classification module 180 receives as input the pre-processed data 280 including the steering rate data, the steering angle data, the slip angle data, the SAT data, and the lateral acceleration data. In addition, the surface classification module 180 receives the condition assessment values 310 including the steering mode 320, the SAT mode 330, and the steering maneuver mode 340. Based on the inputs, the surface classification module 180 determines a surface type 350 and a surface value 360. For example, the surface classification module 180 first evaluates the condition assessment values 310 along with the slip angle data to select a feature set from a number of feature sets. The feature set defines the data to be used in further evaluations.

In various embodiments, the feature sets can include, but are not limited to: set 1 including SAT and slip angle; set 2 including SAT, SAT variance, and slip angle; set 3 including lateral acceleration, steering rate, and slip angle; set 4 including lateral acceleration; and set 5 a default set. The surface classification module 180 selects the feature set 1 when the slip angle is greater than a threshold, the SAT mode indicates linear, and the steering mode indicates normal steering. The surface classification module 180 selects the feature set 2 when the slip angle is within a range, the SAT mode indicates linear, and the steering mode indicates normal steering. The surface classification module 180 selects the feature set 3 when the slip angle is greater than a threshold, the SAT mode indicates linear, and the steering mode indicates fast steering. The surface classification module 180 selects the feature set 4 when the SAT mode indicates non-linear. The surface classification module 180 selects the feature set 5 when the steering maneuver mode indicates a non-steering out maneuver.

The surface classification module 180 then uses the data associated with the feature set to identify the surface type 350. For example, when the feature set is set to one of set 1, set 2, and set 3, the surface classification module 180 evaluates the data associated with the feature set based on a statistical pattern classification method. In another example, when the feature set is set to one of set 4, and set 5 a statistical analysis is not performed rather when the feature set is set 4, the SAT mode is non-linear, and the surface type 350 and the surface value 360 can be readily determined based on the value of lateral acceleration, and when the features set is set 5 default values are used for the surface type 350 and the surface value 360.

In various embodiments, the statistical pattern classification method compares the real-time data associated with the feature set with pre-stored data associated with the same feature set representing typical patterns of the various road surfaces. The pre-stored data may be stored in a patterns datastore 370. The statistical pattern classification method used for identifying the surface type 350 can be, but is not limited to, a linear discriminant analysis (LDA) (e.g., Batch Perception, Fisher Linear Discriminant, and so on), support vector machine (SVM), or other classification method.

The surface classification module 180 then determines the surface value 360 to be the nominal value associated with the determined surface type 350. The nominal values and their associations with the surface type 350 may be pre-determined and stored in the patterns data store 370.

The decision making module 190 receives as input the pre-processed data 280 including the steering angle data, the lateral acceleration data, and the surface type 350, and the surface value 360. Based on the inputs, the decision making module 190 determines a final surface type 380 and a final surface value 390. For example, when the steering angle indicates that the data corresponds to a steering out maneuver, the lateral acceleration data is tracked and evaluated to see if it corresponds to the surface type 350. If the lateral acceleration is large (e.g., greater than a threshold) and the surface type 350 is a high friction type (e.g., dry surface), then the surface type 350 is confirmed as valid and the final surface type 380 is determined to be a high friction type. If the lateral acceleration is large (e.g., greater than a threshold) and the surface type 350, however, is a low friction type (e.g., an icy surface), then the surface type 350 being a low friction surface is a false detection result, (i.e., since a low friction type of surface is unlikely to have a large lateral acceleration). In this case, the decision making module 190 sets the the final surface type 380 and the final surface value 390 to a high-friction surface type (e.g., dry surface).

In various embodiments, the decision making module 190 determines the final surface type 380 based on an analysis of a sequence of single decision points within a moving temporal window frame. For example, the decision making module 190 determines the final surface type 380 by tracking the determined surface value 360 over a window of time. In various embodiments, the window of time can have different sizes and can be reset at different instances.

Figure 3:
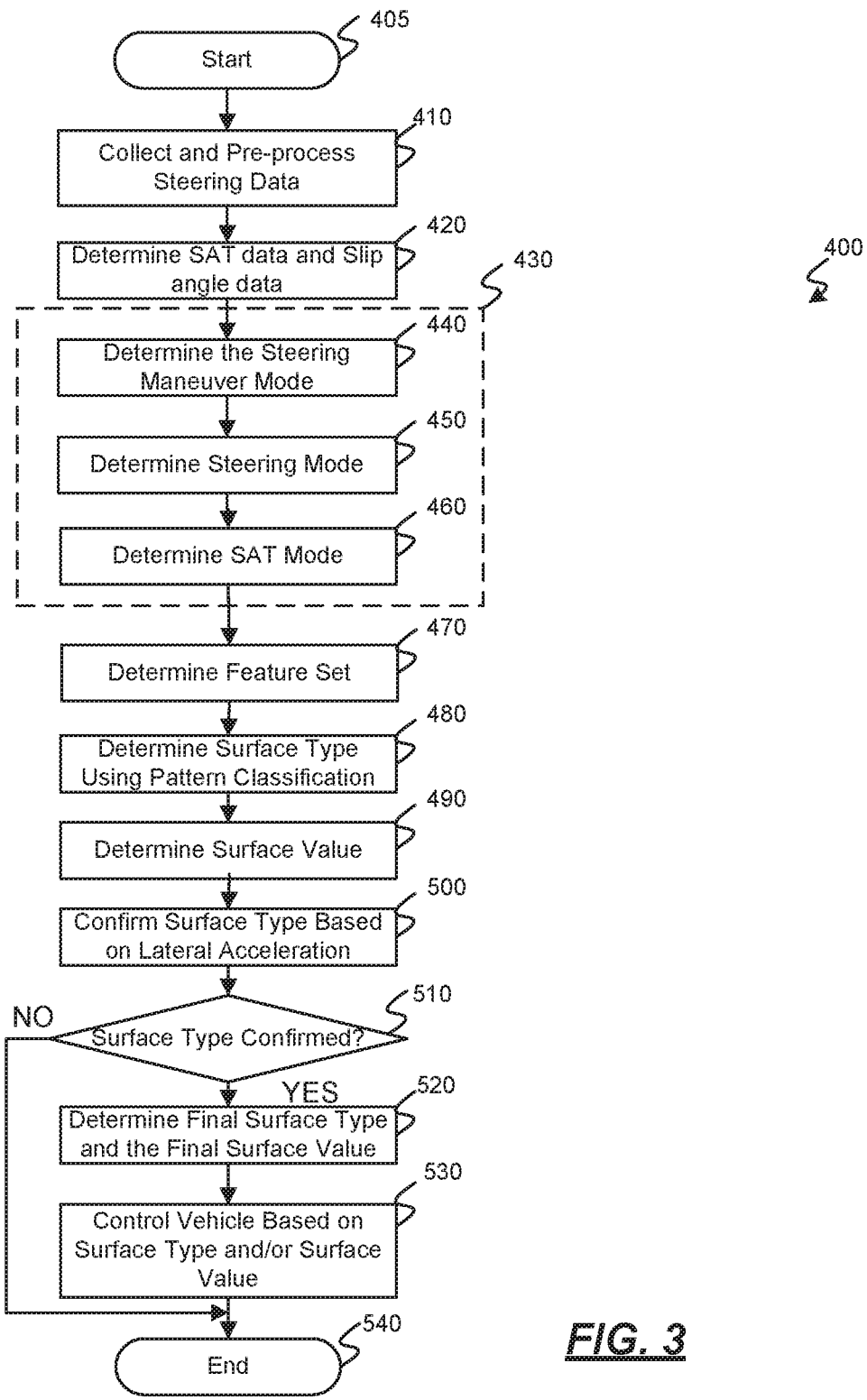
FIGS. 3 and 4 are flow charts illustrating methods for estimating road surface information, in accordance with various embodiments.
Figure 4:
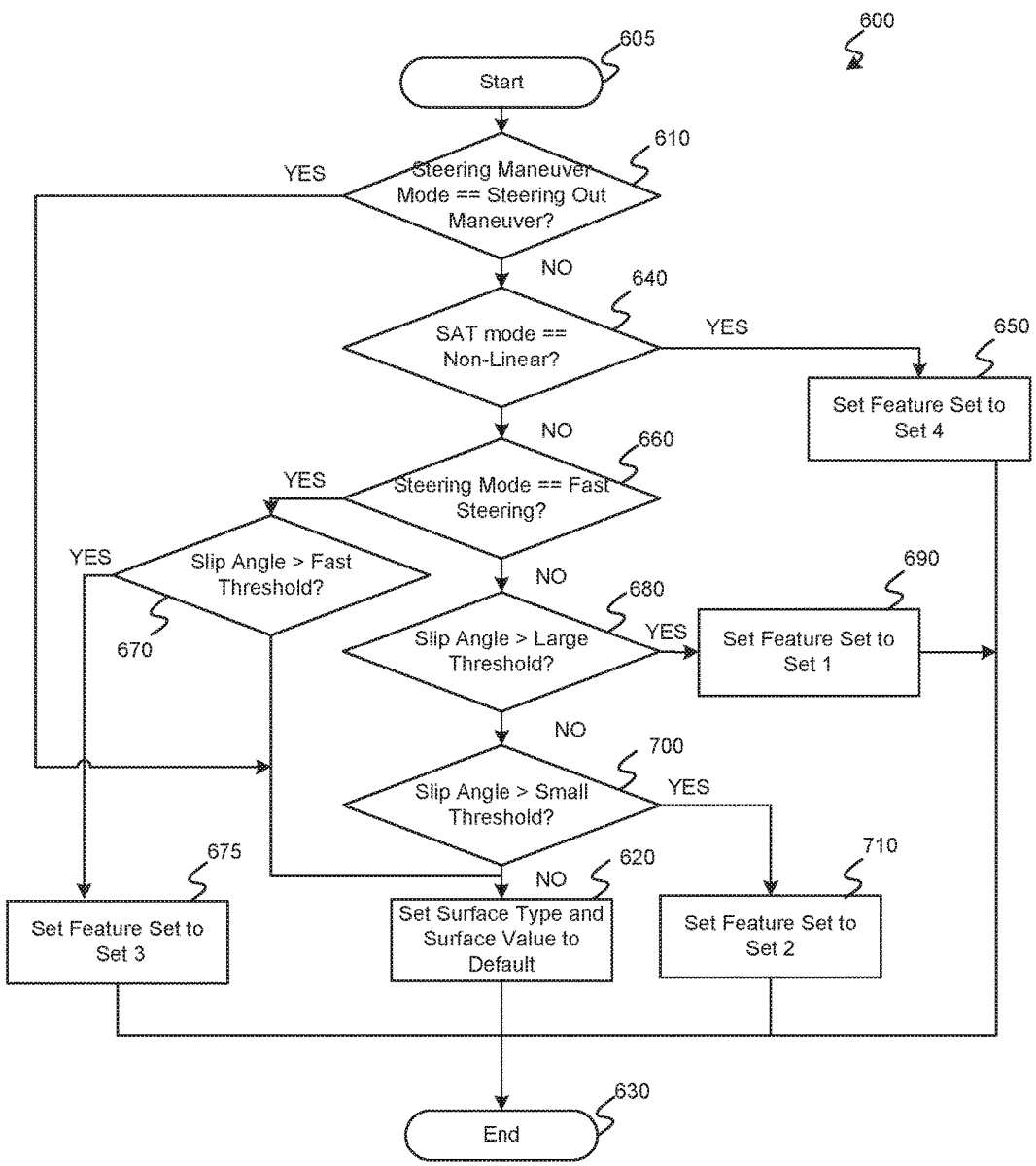

With reference now to FIGS. 3 and 4, and with continued reference to FIGS. 1-2, flowcharts are shown of methods 400 and 600 for determining a surface type and surface value and controlling a vehicle based on the surface type and the surface value, in accordance with various embodiments. The methods 400 and 600 can be implemented in connection with the vehicle 100 of FIG. 1 and can be performed by the control module 120 of FIG. 1, in accordance with various exemplary embodiments. As can be appreciated in light of the disclosure, the order of operation within the method is not limited to the sequential execution as illustrated in FIGS. 3 and 4, but may be performed in one or more varying orders as applicable and in accordance with the present disclosure. As can further be appreciated, the methods of FIGS. 3 and 4 may be scheduled to run at predetermined time intervals during operation of the vehicle 100 and/or may be scheduled to run based on predetermined events.

FIG. 3 is a flowchart of a method for determining the final surface type 380 and the final surface value 390 and for controlling the vehicle 100 based thereon. As depicted in FIG. 3, the method 400 may begin at 405. The steering data 200 is collected and pre-processed at 410. The SAT data and the slip angle data are determined based on the collected steering data 200 at 420. Thereafter, the condition assessment values 310 are determined based on the pre-processed data 280 at 430. In particular, the steering maneuver mode 340 is determined based on the steering angle at 440. The steering mode 320 is determined based on the steering rate at 450, and the SAT mode 330 is determined based on the SAT data and lateral acceleration data at 460.

Thereafter, the feature set is determined based on the condition assessment values 310 at 470. The data associated with the feature set is processed using a classification method (e.g., linear discriminant analysis or other methods) and the stored patterns to identify the surface type 350 at 480. The surface value 360 is determined based on the surface type 350 at 490. The surface type 350 is confirmed based on an evaluation of the lateral acceleration at 500. If the surface type 350 is confirmed at 510, the surface value 360 and the surface type 350 are processed to determine the final surface type 380 and the final surface value 390 at 520. Thereafter, one or more systems of the vehicle are controlled based on the final surface type 380 and/or the final surface value 390 at 530 and the method may end at 540. If, however, the surface type 350 is not confirmed at 530, the method may end at 540.

FIG. 4 is a flowchart of a method 600 for determining the feature set as shown at 470 of FIG. 3. The method may begin at 605. The steering maneuver mode 340 is evaluated at 610. If the steering maneuver mode 340 does not indicate a steering out maneuver at 610, the method proceeds to 620, where the surface type 350 and the surface value 360 are set to default values (e.g., a previous value, or other predetermined default value) and the method may end at 630.

If, however, the steering maneuver mode 340 indicates a steering out maneuver at 610, the SAT mode 330 is evaluated at 640. If the SAT mode 330 indicates a non-linear SAT, set 4 is selected as the feature set, which includes the lateral acceleration at 650. Thereafter, the method may end at 630.

If, however, the SAT mode 330 indicates a linear SAT at 640, the steering mode 320 is evaluated at 660. If the steering mode 320 indicates fast steering at 660, the slip angle data is evaluated at 670. If the slip angle is less than a threshold at 670, the method proceeds to 620, where the surface type 350 and the surface value 360 are set to default values (e.g., a previous value, or other predetermined default value) and the method may end at 630.

If, however, at 670, the slip angle is greater than the threshold, set 3 is selected as the feature set at 675, which includes the lateral acceleration, the steering rate, and the slip angle. Thereafter, the method may end at 630.

If, at 660, the steering mode indicates does not indicate fast steering rather indicates normal steering, the slip angle data is evaluated at 680. For example, if the slip angle is greater than a first threshold (e.g., a high threshold indicating a large slip) at 680, set 1 is selected as the feature set, which includes the SAT, and the slip angle at 690. Thereafter, the method may end at 630.

If, however, the slip angle is less than the first threshold at 680, the slip angle is compared with a second threshold (e.g., a low threshold indicating a small slip) at 700. If the slip angle is greater than the second threshold at 700, set 2 is selected as the feature set, which includes the SAT, the SAT variance, and the slip angle at 710. Thereafter, the method may end at 630. If, however, the slip angle is less than the second threshold at 700, the method proceeds to 620 the surface type 350 and the surface value 360 are set to default values (e.g., a previous value, or other predetermined default value) and the method may end at 630.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for determining road surface information in a vehicle, comprising:
   receiving, by a processor, slip angle data, self-aligning torque data, lateral acceleration data, steering angle data, and steering rate data;
   selecting, by the processor, a feature set from a plurality of feature sets based on an evaluation of the slip angle data, the self-aligning torque data, the lateral acceleration data, the steering angle data, and the steering rate data;
   wherein a first feature set of the plurality of feature sets includes self-aligning torque (SAT) and slip angle; wherein a second feature set of the plurality of feature sets includes SAT, SAT variance and slip angle; wherein a third feature set of the plurality of feature sets includes lateral acceleration, steering rate and slip angle; and wherein a fourth feature set of the plurality of feature sets includes lateral acceleration;
   processing, by the processor, steering data obtained during a steering maneuver and associated with the selected feature set using a pattern classification technique;
   determining, by the processor, a surface type based on the processing; and
   outputting a signal indicating the surface type for use in controlling the vehicle,
   wherein the pattern classification technique compares real-time data and pre-stored data associated with the selected feature set using at least one of a linear discriminant analysis and a support vector machine analysis.

2. The method of claim 1, wherein the evaluation is of a steering mode that is associated with the steering rate data.

3. The method of claim 1, wherein the evaluation is of a SAT mode that is associated with a linearity of the SAT data.

4. The method of claim 1, further comprising determining a steering maneuver type based on the steering angle data, and wherein the evaluation and the processing the steering data is based on the steering maneuver type.

5. The method of claim 4, wherein the steering maneuver type is at least one of a steering out maneuver and a non-steering out maneuver.

6. The method of claim 5, wherein the determining the surface type is based on a default value instead of the selected feature set, when the steering maneuver type is determined to be the non-steering out maneuver.

7. The method of claim 1, further comprising:
   determining a slip angle to be greater than a threshold based on the slip angle data determining a SAT mode to be linear based on the SAT data and the lateral acceleration data; determining the steering mode to be normal steering based on the steering rate data; and
   wherein the selecting the feature set comprises selecting the first feature set based on the determination of the slip angle being greater than the threshold, the SAT mode being linear, and the steering mode being normal.

8. The method of claim 1, further comprising:
   determining a slip angle to be within a range based on the slip angle data determining a SAT mode to be linear based on the SAT data, and the lateral acceleration data; and determining the steering mode to be normal steering based on the steering rate data; and
   wherein the selecting the feature set comprises selecting the second feature set based on the slip angle being within the range, the SAT mode being linear, and the steering mode being normal steering.

9. The method of claim 1, further comprising:
   determining a slip angle to be greater than a threshold based on the slip angle data determining a SAT mode to be linear based on the SAT data, and the lateral acceleration data; and determining the steering mode to be fast steering based on the steering rate data; and
   wherein the selecting the feature set comprises selecting the third feature set based on the slip angle being greater than the threshold, the SAT mode being linear, and the steering mode being fast steering.

10. The method of claim 1, further comprising:
    determining a SAT mode to be nonlinear, and
    wherein the selecting the feature set comprises selecting the fourth feature set based on the SAT mode being nonlinear.

11. The method of claim 1, further comprising determining a surface value based on the surface type.

12. The method of claim 1, further comprising confirming the surface type based on an evaluation of lateral acceleration.

13. The method of claim 1, further comprising determining a final surface type based on a plurality of determined surface types within a temporal moving window.

14. A system for determining road surface information in a vehicle, comprising:
- a condition assessment module that processes slip angle data, self-aligning torque data, lateral acceleration data, steering angle data, and steering rate data;
- a feature set determination module that selects a feature set from a plurality of feature sets based on an evaluation of the slip angle data, the self-aligning torque data, the lateral acceleration data, the steering angle data, and the steering rate data; wherein a first feature set of the plurality of feature sets includes self-aligning torque (SAT) and slip angle; wherein a second feature set of the plurality of feature sets includes SAT, SAT variance and slip angle; wherein a third feature set of the plurality of feature sets includes lateral acceleration, steering rate and slip angle; and wherein a fourth feature set of the plurality of feature sets includes lateral acceleration; and
- a surface classification module that processes the steering data obtained during a steering maneuver and associated with the selected feature set using a pattern classification technique to determine a surface type,
- wherein the pattern classification technique compares real-time data and pre-stored data associated with the selected feature set using at least one of a linear discriminant analysis and a support vector machine analysis.

15. The system of claim 14 further comprising a decision making module that determines a final surface type based on a plurality of determined surface types within a temporal moving window.

* * * * *